No. 778,184. PATENTED DEC. 20, 1904.
H. A. FONTEINE.
HORSE COLLAR.
APPLICATION FILED FEB. 26, 1904.
NO MODEL. 4 SHEETS—SHEET 3.

Witnesses:
W. H. Ourand
A. W. Crossley

Inventor:
Herman A. Fonteine,
By Sans Pagge & Co.,
Attorneys.

No. 778,184. PATENTED DEC. 20, 1904.
H. A. FONTEINE.
HORSE COLLAR.
APPLICATION FILED FEB. 26, 1904.
NO MODEL. 4 SHEETS—SHEET 4.
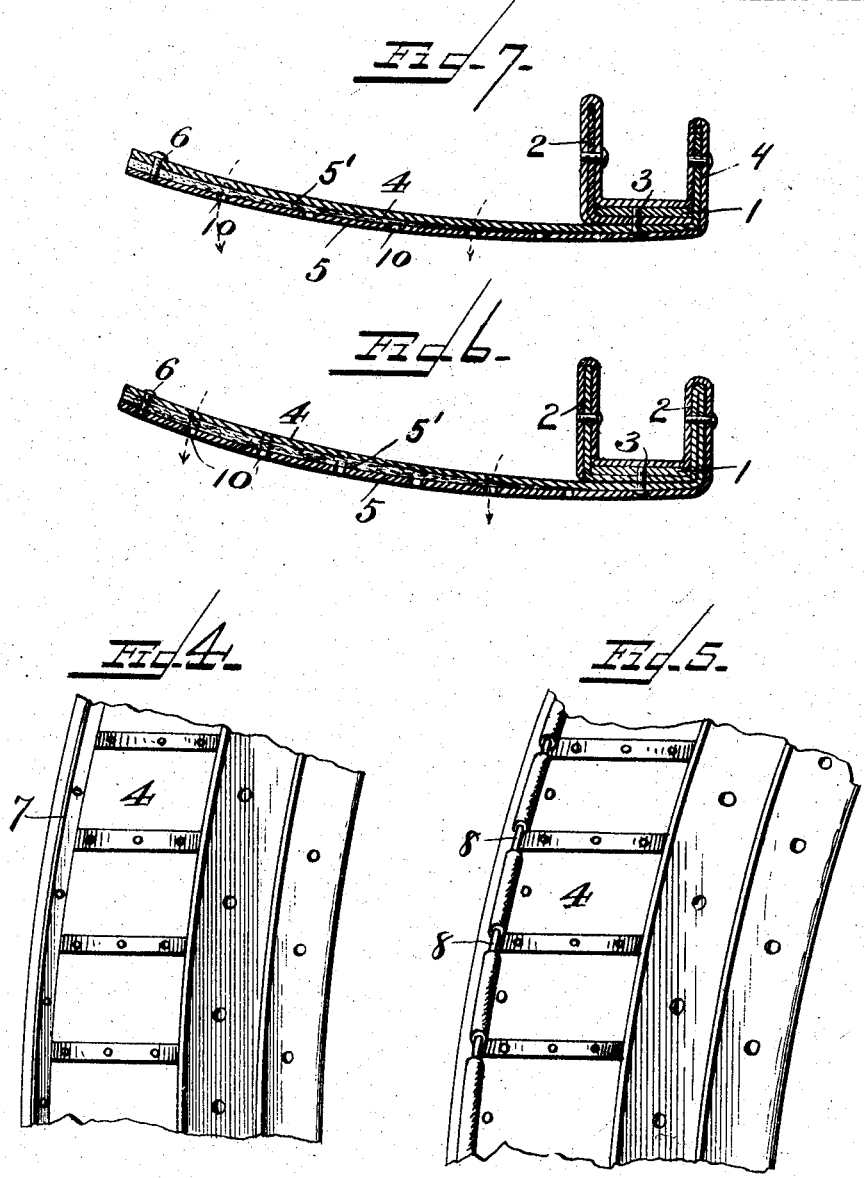
Witnesses:
W. H. Durand
A. W. Crossley
Inventor:
Herman A. Fonteine
By Louis Bagger & Co.,
Attorneys.

No. 778,184. Patented December 20, 1904.

UNITED STATES PATENT OFFICE.

HERMAN A. FONTEINE, OF AUBURN, NEW YORK, ASSIGNOR OF FOUR-NINTHS TO JOHN H. CROUSE, OF AUBURN, NEW YORK.

HORSE-COLLAR.

SPECIFICATION forming part of Letters Patent No. 778,184, dated December 20, 1904.

Application filed February 26, 1904. Serial No. 195,461.

*To all whom it may concern:*

Be it known that I, HERMAN A. FONTEINE, a citizen of the United States, residing at Auburn, in the county of Cayuga and State of New York, have invented certain new and useful Improvements in Horse-Collars, of which the following is a specification.

This invention has relation to horse-collars generally; and it has for its object the provision of a horse-collar that may be composed of any suitable material and when in use bear with soft, resilient, and even effect on all parts of the horse's shoulders, besides being light in weight and of great strength and durability and possessing other points of advantage also of considerable consequence.

The invention consists of a horse-collar comprising in its construction a rim or band to which is secured a series of springs forming the bearing for the hames and a secondary series of curved springs secured to the same rim or band and forming the shoulder and neck pad. The two series of springs may be made from the same piece of metal and be variously bent and the collar as a whole covered with thin sheet-steel, leather, or rawhide, and the band or rim may be made of rawhide or other suitable material and the parts riveted or otherwise secured in place, all as I will now proceed to describe and claim.

Figure 1:
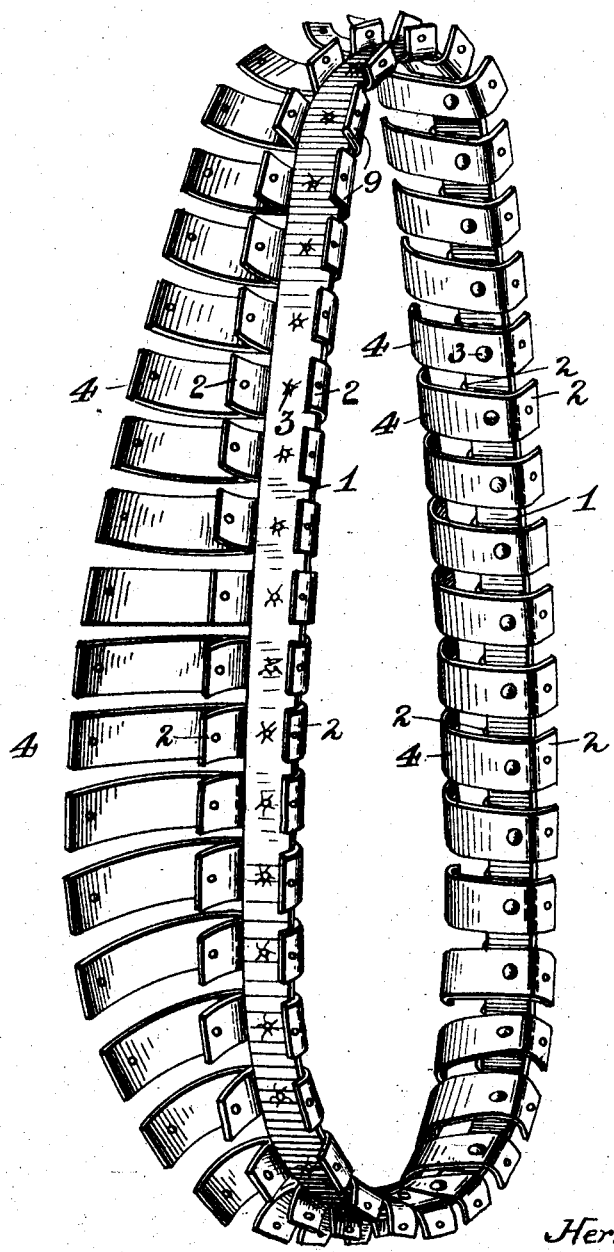
Figure 2:
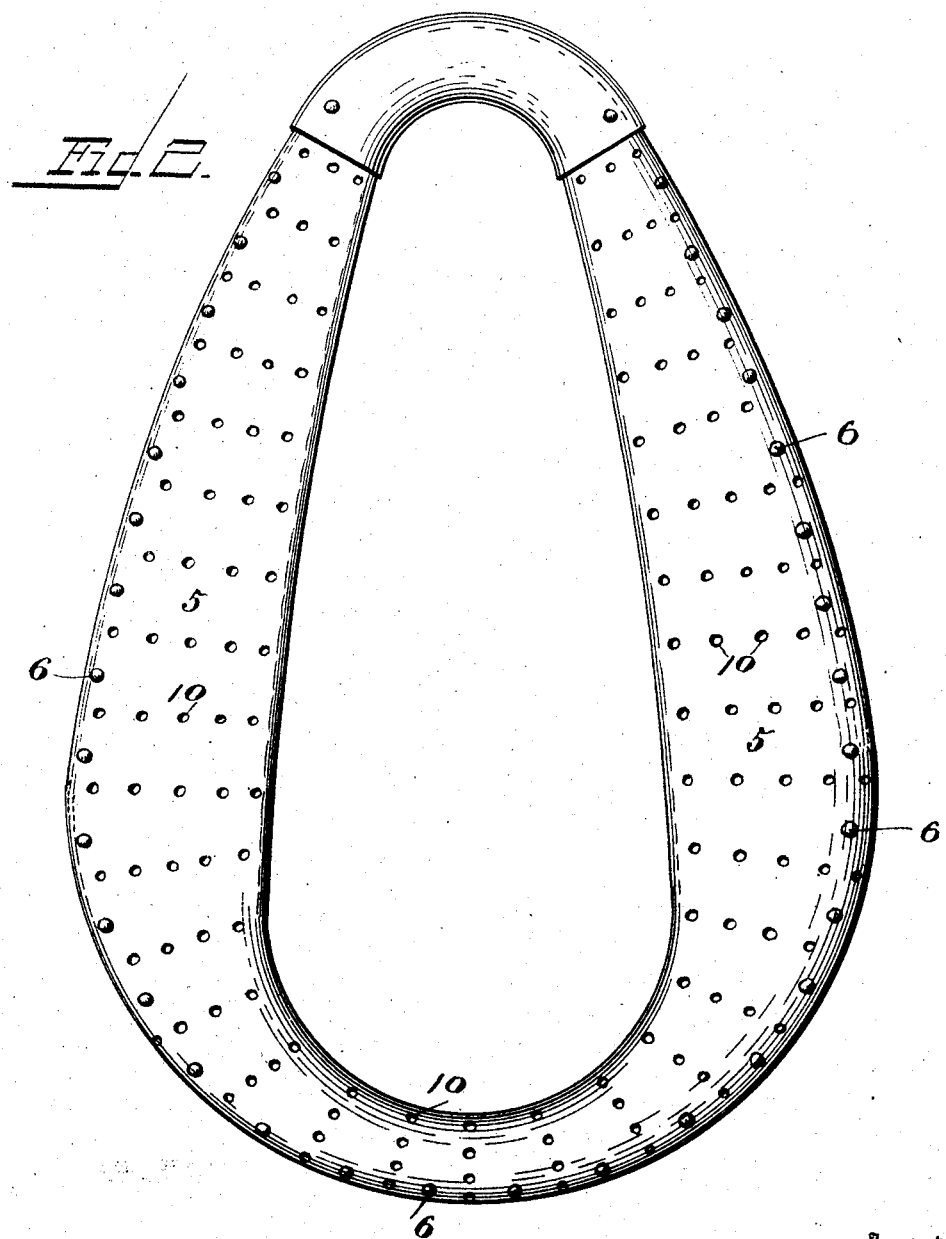
Figure 3:
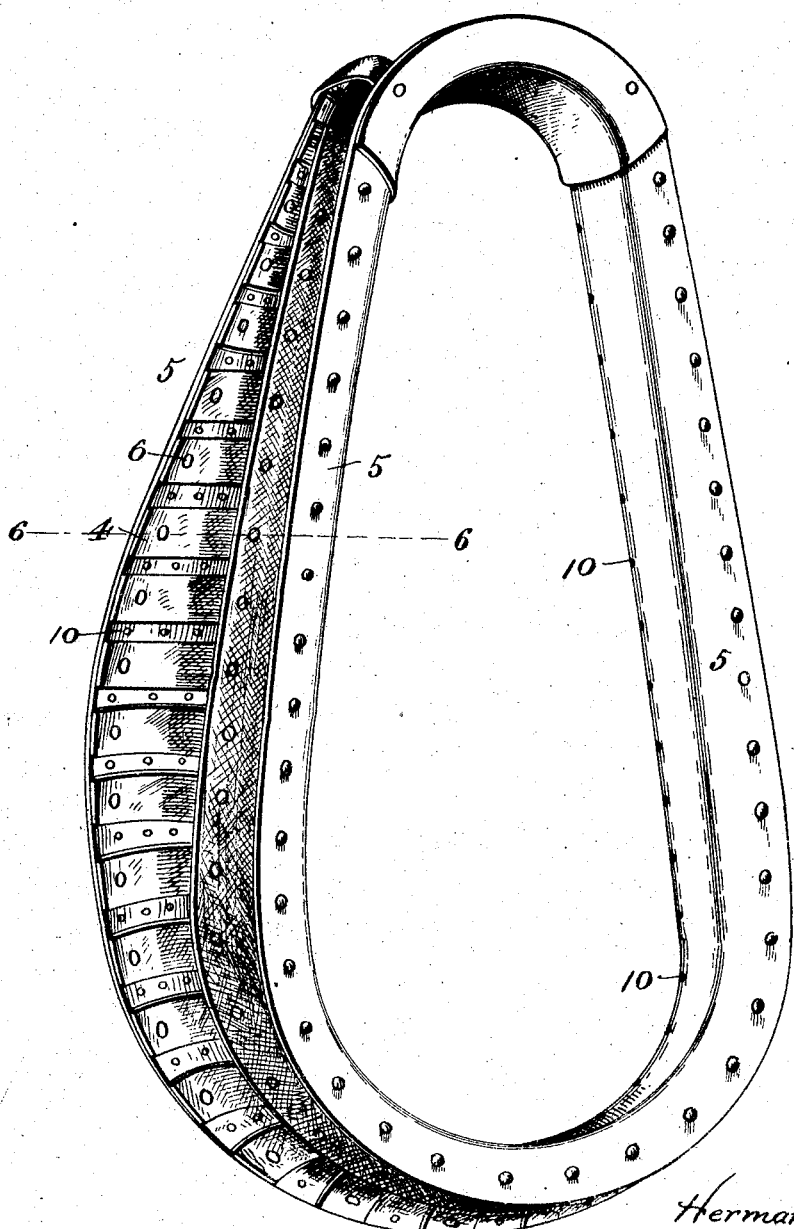

Of the drawings hereunto annexed and forming a part of this specification, Figure 1 is a perspective view of one form of my improved horse-collar, the covering being removed. Fig. 2 is a front view of the same complete and supposedly covered with leather, rawhide, thin sheet-steel, or other suitable substance. Fig. 3 is a rear view of one form of a complete collar. Figs. 4 and 5 are fragmentary detail views showing different constructions of the collar. Fig. 6 is a sectional view taken on the line 6 6 of Fig. 3. Fig. 7 is a sectional view similar to Fig. 6, but showing a slightly-modified construction.

The same numerals designate the same parts or features wherever they occur.

In the drawings, referring first to Figs. 1, 2, and 7, the numeral 1 designates a band of metal of suitable size and form to fit the neck of a horse where the base of the hames (not shown) are designed to come, and 2 designates a series of curved springs bent to embrace the rim and riveted thereto at suitable intervals by rivets 3, so as to embrace the base of the hames when the same are placed in position on the rim. 4 designates a secondary series of springs formed so as to be secured to the band 1 by the same rivets 3 that attach the springs 2 thereto. The last-mentioned springs are curved at their free ends, as shown. The collar-frame thus formed is covered by a covering 5 of sheet metal, leather, or other suitable material, which extends over the hames-support and around and under the same and the springs 4 to the outer ends of the latter, where it is attached to them by rivets 6, it being secured to the hames-support by means of rivets 2 and to the rim 1 by rivets 3, all as is clearly represented in Figs. 6 and 7. At its outer edge the covering may instead be secured to a flat band 7 extending around on the ends of the springs 4, as shown in Fig. 4, or to a wire 8 extending around on the ends of the springs 4, similar to the band 7, around which wire the free ends of the springs 4 are curled, as shown in Fig. 5. By this means a secure support may be formed for the hames, while a soft resilient cushion for the shoulders and neck of the horse may be created that will make it bear evenly at all points.

The springs 2 4 may be formed of one piece of metal by bending one end of the strip upon itself to form the spring 2 and shaping the other end to form the spring 4, as shown at 9 at the top of Fig. 1 and as shown more clearly still in Fig. 6. In the latter figure the form of the springs 2 constitute the hame rest or holder and the covering for the framework of the entire collar is shown in one of its most desirable forms, and in this figure is also shown one of the desirable ways which the covering for the springs for the shoulder-pads may be lined, the lining being designated by the symbol 5'.

The covering may be perforated, as represented at 10, to ventilate the shoulder-pads, and so keep it from chafing or galling the parts against which it bears.

In Figs. 4 and 5 it is shown that the hame-rest may be made of a single strip of sheet metal instead of being formed of a series of springs, as before described; but in all cases the framework for the shoulder-pads will be formed of a series of springs 4, attached to the hame-rest at their inner ends and bent outwardly to fit the shoulders of the horse, as indicated.

The invention may be applied to collars open at the top or bottom of the neck or closed at both points.

The flexibility and form of the spring constituting the shoulder-pads make the latter quite as soft and yielding as a pneumatic horse-collar, but of much greater strength and serviceability.

I claim—

1. A horse-collar consisting of a band with a series of flat springs secured thereto, the inner ends of said springs being bent to form the hames-rest and the outer portions being shaped to form the shoulder-pads.

2. A horse-collar consisting of a band with a series of flat springs secured thereto, the inner ends of said springs being bent to form the hames-rest and the outer portions being shaped to form the shoulder-pads, and a covering for the latter, the said covering being perforated for the purpose of ventilation.

3. A horse-collar consisting of a hames-rest and a series of flat springs each secured at its inner end to the hames-rest, and the outer ends being shaped to form the shoulder-pads.

4. A horse-collar provided with a hames-rest having a band at the base thereof and a series of flat springs, each secured at its inner end to the hames-rest, and the outer ends being shaped to form the shoulder-pads.

5. A horse-collar consisting of a band with a series of flat springs secured thereto, the inner ends of said springs being bent to form the hames-rest and the outer portions being shaped to form the shoulder-pads, and a covering for the hames-rest and shoulder-pads, substantially as described.

6. A horse-collar consisting of means to form the base of a hames-rest, with a series of flat springs secured thereto, the inner ends of said springs being bent to assist in forming the hames-rest, and the outer portions being shaped to form the shoulder-pads.

7. A horse-collar consisting of means to form the base of the hames-rest, with a series of flat springs secured thereto, the inner ends of said springs being bent to assist in forming the hames-rest, and the outer portions being shaped to form the shoulder-pads, and a covering for the hames-rest and shoulder-pads, as described.

In testimony whereof I have signed my name to this specification in presence of two witnesses.

HERMAN A. FONTEINE.

Witnesses:
  SAMUEL ODELL,
  GEORGE W. SIMMONS.